May 5, 1931.  F. ROUSE  1,803,408
MOLDING MACHINE
Filed Dec. 5, 1927  3 Sheets-Sheet 1

Inventor
Frank Rouse
By Hardway Cathey
Attorneys

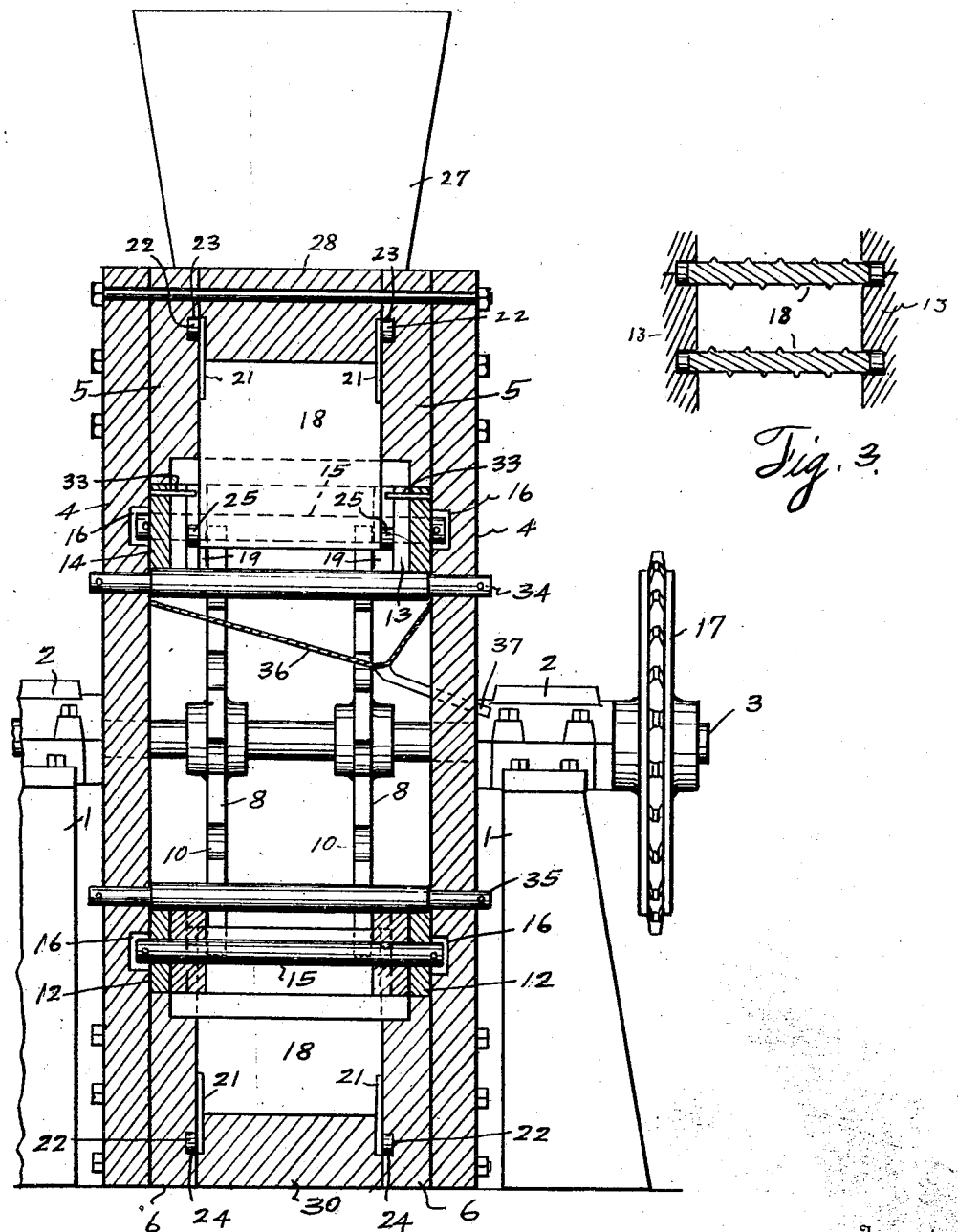

May 5, 1931. F. ROUSE 1,803,408
MOLDING MACHINE
Filed Dec. 5, 1927 3 Sheets-Sheet 3
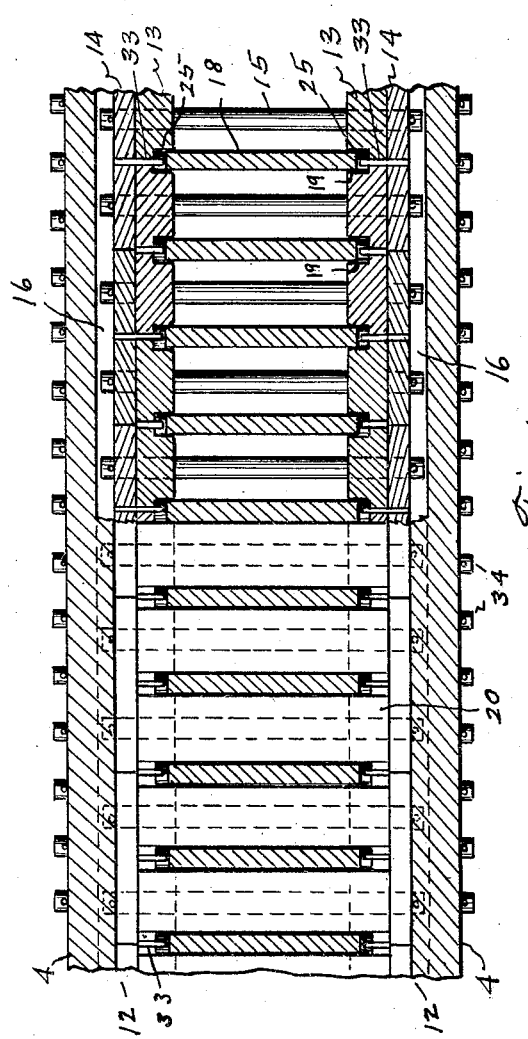
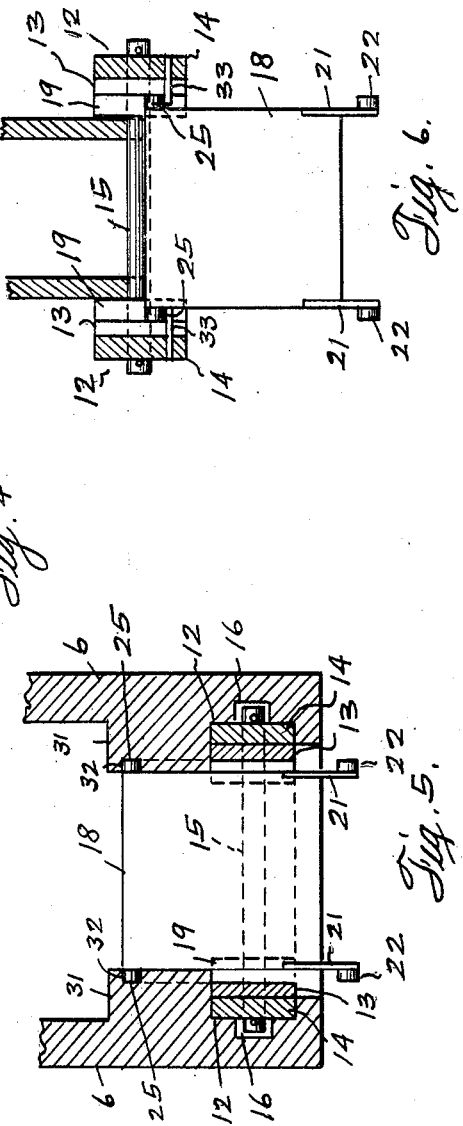
Inventor
Frank Rouse
By Hardway Cathey
Attorneys Patented May 5, 1931

1,803,408

UNITED STATES PATENT OFFICE

FRANK ROUSE, OF HOUSTON, TEXAS

MOLDING MACHINE

Application filed December 5, 1927. Serial No. 237,646.

This invention relates to new and useful improvements in a molding machine.

One object of the invention is to provide a machine of the character described specially designed for molding brick and other building units from plastic material.

Another object of the invention is to provide a machine of the character described having constantly movable matrices adapted to receive plastic material, with means for gradually applying pressure to the material in the matrices until the desired final dimensions of the units are obtained, said machine also embodying novel means for releasing the units as finally formed.

A further feature of the invention is to provide a machine of the character described embodying means for applying a surfacing material to the units, and embedding the same therein, while the units are being molded.

A still further feature of the invention is to provide a machine that is very strong and durable and is so constructed and arranged to operate that the material to be molded may be continuously fed thereto and the molded units continuously delivered therefrom, having the exact final dimensions desired.

With the above and other objects in view this invention relates to certain novel features of construction, operation and arrangement of parts an example of which is given in this specification and illustrated in the accompanying drawings, wherein:—

Figure 2 shows a transverse vertical sectional view, taken on the line 2—2 of Figure 1.

Figure 3 shows a fragmentary horizontal sectional view showing a modified type of mould partitions employed.

Figure 4 shows a fragmentary horizontal sectional view taken on the line 4—4 of Figure 1.

Figure 5 shows a fragmentary transverse vertical sectional view taken on the line 5—5 of Figure 1, and Figure 6 shows a fragmentary transverse vertical sectional view taken on the line 6—6 of Figure 1.

Figure 1:
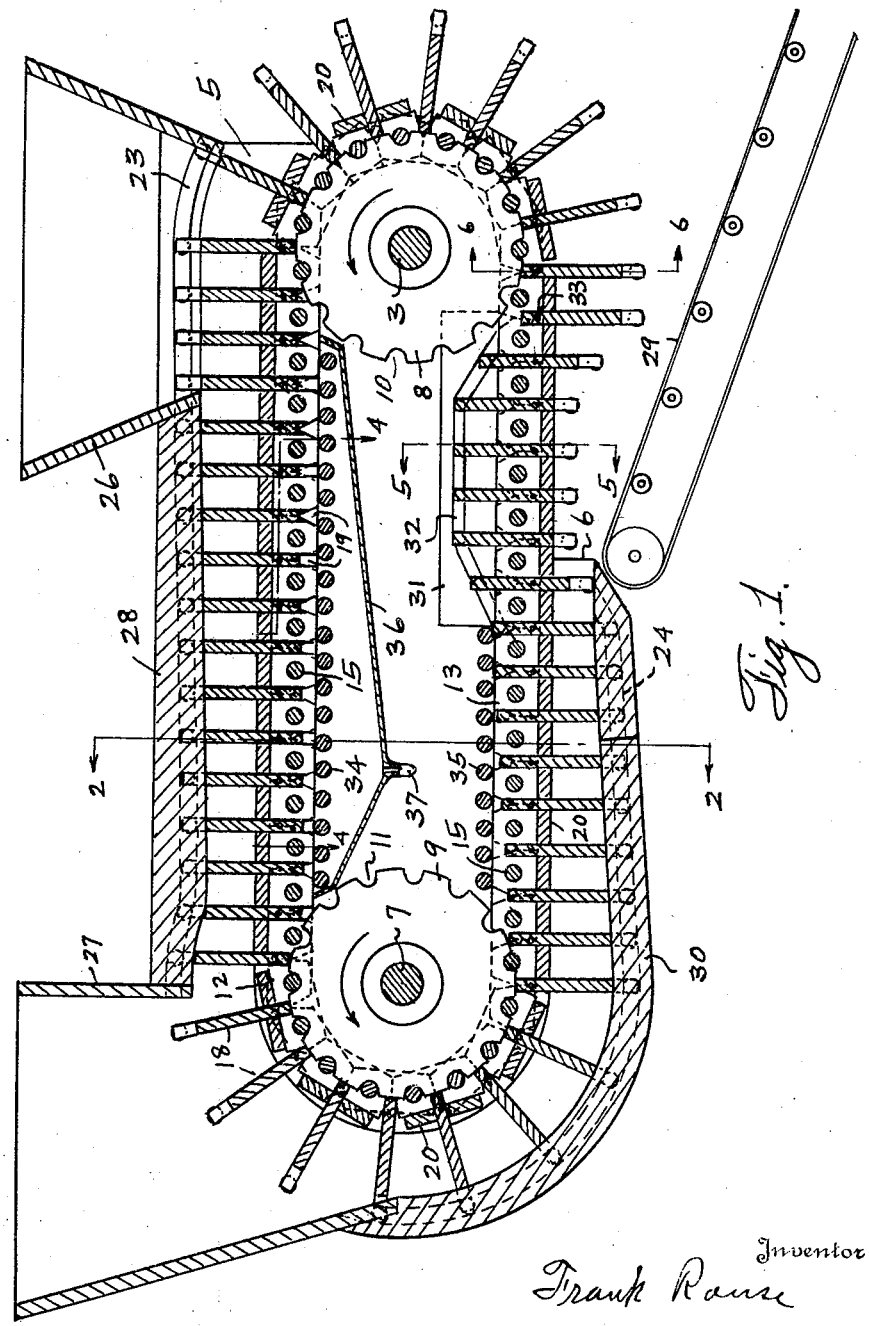
Fig. 1 shows a longitudinal vertical sectional view of the machine.

Referring now more particularly to the drawings, wherein like numerals of reference designate similar parts in each of the figures the numerals 1, 1, designate supporting standards, spaced apart and having the bearings 2, 2, mounted on the upper ends thereof in which the transverse driving shaft 3 is rotatably mounted. The numerals 4, 4, designate the sides of the mould housing and secured to the inner sides of which are the stationary sides 5, 5, and 6, 6, of the upper and lower matrices, hereinafter referred to. The shaft 3 works through suitable aligned bearings in the sides 4, 4, at one end of the housing and at the other end of the housing there is the transverse shaft 7 mounted to rotate in suitable bearings in the sides 4. The shafts 3 and 7 have the similar spaced driving discs, 8, 8 and 9, 9, respectively, fixed thereon, said discs being provided with the marginal notches 10 and 11.

There are the endless side chains, designated generally by the numerals 12, 12. Each chain is formed of the inner and outer links 13 and 14, arranged in staggered relation, with the adjacent ends of the corresponding links overlapping and a series of cross rods, as 15, have their respective ends journaled through said overlapping ends of the links of the respective chains 12, with their respective ends projecting into the grooves, or tracks, 16, 16 provided for them in the sides 4. The rods 15 are so spaced that they will seat in the notches 10, 11, of the discs 8, 9. The shaft 3 has a driving sprocket wheel 17 fixed on one end thereof, through which said shaft may be driven, and the discs 8 rotated and the chains 12 revolved about said discs 8 and 9. The adjacent ends of the respective links are beveled so that they will not bind in passing around said discs, as clearly shown in Figure 1.

Matrix partitions 18, are provided and are spaced a uniform distance apart with their margins located in the inside vertical grooves 19, of the chains 12. Alternate grooves 19, are cut in the inside links 13, and the other grooves 19 are provided by spacing the adjacent ends of said links 13 apart, as shown in Figures 1 and 4.

There are the matrix bottoms 20 whose ends are fastened on the oppositely disposed inside links 13, of the chains 12, said bottoms extending transversely and being spaced a sufficient distance apart to permit the partitions 18 to work snugly between them. These partitions, at one end, have the spaced outwardly extending side arms 21, 21, whose free ends have the outwardly extending roller bearings 22, 22 which run in the inside grooves, or tracks 23, 23 and 24, 24 in the upper and lower sides 5 and 6 of the matrices, as the partitions revolve with the chains 12. At their other ends the partitions 18 have the outwardly extending roller bearings 25, 25 which move in the grooves 19.

At one end of the mould housing there is a primary feed hopper 26 through which the plastic material to be moulded may be delivered into the matrices, between the partitions 18, as said matrices pass under said hopper, and at the other end of said housing there is another hopper 27, which is primarily intended for applying surface coating material, such as broken granite, marble, or the like, to the units, while they are being moulded but this hopper 27 may also be used as a feed-hopper for the plastic material, if desired. Between the hoppers 26 and 27 there is a cover plate 28 which is fitted between the sides 5, 5 at their upper margins and which gradually declines from the hopper 26 toward the hopper 27 so that the material in the matrices will be gradually compressed as said matrices move along toward the last named hopper.

Arranged between the hopper 27 and the delivery conveyer 29, of the mould and disposed between the lower margins of the sides 6, 6, there is a plate 30, whose end, adjacent said hopper 27, is arcuate and concentric with the discs 9, and whose other end is extended and converges toward the bottoms 20 of the matrices so as to place the units being moulded under additional compression. While the units being moulded are traveling through these final matrices and receiving their final compression the coating material delivered to them through the hopper 27 will be embedded into the coated surfaces thereof, thus giving said units a smooth finish. The units are finally delivered onto the traveling conveyor 29, of any conventional construction, by which they are conveyed to the desired place.

In order to permit the discharge of the moulded units the partitions 18 must be withdrawn from their path and in order to accomplish this the sides 6, 6, opposite the discharge end of the mould, are inwardly thickened as at 31, 31 and the inwardly thickened portions 31 have the inside upwardly curved grooves or tracks 32, 32, disposed to receive the rollers 25 and to successively lift the partitions 18 clear of the completed units to permit their discharge onto the conveyor 29. After the rollers 25 have passed along the tracks 32 they descend to their original position, as shown in Figure 1, and the inwardly extending pins 33 are provided, which project out into the grooves 19 and against which the bearings 25 are adapted to engage to prevent the partitions 18 from dropping out of said grooves 19, as clearly shown in Figure 6.

In order to prevent the chains 12 from sagging under the pressure to which they are subjected the upper and lower series of rollers 34, and 35 are provided, whose ends are journaled in the sides 4, 4 of the housing, and against which the chains bear when subjected to the pressure of the material while being compressed in the matrices. Within the housing and disposed between the hoppers 26, 27 and arranged beneath the rollers 34 there is a pan 36, which has a side outlet spout 37, and which is provided to receive and discharge any liquid which may be discharged from the material to be moulded, when first subjected to the pressure in the moulding process.

It is sometimes desirable to form the brick, or other units, with side grooves, in staggered relation, to receive the mortar, or other binding material used in building the units into a structure and for this purpose the matrix partitions 18' may be provided with ribs to form such grooves in the process of molding.

While I have shown what I now consider the preferred form of the invention it is obvious that mechanical changes may be made therein and equivalents substituted for the parts shown and I reserve the right to make such mechanical changes, adaptations and substitutions as may be comprehended within the scope of the appended claims.

What I claim is:—

1. A molding machine including endless side chains forming a carrier, matrix bottoms thereon, partitions between said bottoms, movable at right angles to the plane of movement of said chains, stationary sides which form with said bottoms and partitions, enclosed matrices, adapted to receive and mould plastic material into units, and means through which said material may be fed into said matrices, one of said sides converging from said feeding means toward said carrier.

2. A molding machine including a housing, an endless revolving carrier therein, means for revolving the carrier, a chute through which the carrier moves, partitions on the carrier, spaced apart and forming, with the walls of said chute, matrices in which plastic material may be molded, an inlet through which plastic material may be fed into said matrices said chute being contracted from said inlet toward its other end, a conveyor at the discharge end of the chute onto which the units are discharged, and means for successively withdrawing the partitions upwardly from in front of the units moulded in the matrices to permit the discharge of said units therefrom onto said conveyor.

3. A molding machine including a housing whose side walls have inside tracks, an endless carrier therein having marginal means movable in said tracks, means for revolving said carrier, a plurality of chutes through which the carrier moves, one wall of each chute converging from one end of the chute toward the carrier, partitions on the carrier, which form matrices, with the walls of said chutes, wherein units may be moulded and compressed from plastic material.

4. A molding machine including a housing, an endless carrier therein, means for revolving said carrier, a plurality of chutes through which the carrier moves, one wall of each chute converging from one end of the chute toward the carrier, partitions on the carrier, which form matrices, with the walls of said chutes, wherein units may be moulded and compressed from plastic material, one of said chutes having an inlet end for plastic material and the other chute having a discharge end for the moulded units, and means for elevating and withdrawing the partitions from the said discharge end to permit the discharge of the moulded units therefrom, said means being effective to thereafter permit the lowering of said elevated partitions by gravity.

5. A molding machine including a housing, an endless carrier therein, means for revolving said carrier, a plurality of chutes through which the carrier moves, one wall of each chute converging from one end of the chute toward the carrier, partitions on the carrier, which form matrices, with the walls of said chutes, wherein units may be moulded and compressed from plastic material, said partitions being movable transversely with respect to the carrier and means for elevating said partitions, vertically and for permitting them to drop by gravity, in succession.

6. A mould machine including a housing, an endless carrier therein, means for revolving said carrier, a plurality of chutes through which the carrier moves, one wall of each chute converging from one end of the chute toward the carrier, partitions on the carrier, which form matrices, with the walls of said chutes, wherein units may be moulded and compressed from plastic material, and a feed hopper at the large end of each chute.

In witness whereof I have signed my name to this specification.

FRANK ROUSE.